US011064422B2

(12) United States Patent
Cakulev et al.

(10) Patent No.: US 11,064,422 B2
(45) Date of Patent: Jul. 13, 2021

(54) SYSTEM AND METHOD FOR ENABLING SUBSCRIBER-BASED POLICY DECISIONS

(71) Applicant: Verizon Patent and Licensing Inc., Arlington, VA (US)

(72) Inventors: Violeta Cakulev, Millburn, NJ (US); Lalit R. Kotecha, San Ramon, CA (US); Sudhakar Reddy Patil, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 39 days.

(21) Appl. No.: 16/414,236

(22) Filed: May 16, 2019

(65) Prior Publication Data

US 2020/0367141 A1   Nov. 19, 2020

(51) Int. Cl.
*H04W 48/04*    (2009.01)
*H04W 4/24*     (2018.01)
(Continued)

(52) U.S. Cl.
CPC ......... *H04W 48/04* (2013.01); *H04L 12/1407* (2013.01); *H04L 63/20* (2013.01);
(Continued)

(58) Field of Classification Search
CPC ..... H04W 80/10; H04W 60/00; H04W 48/16; H04W 60/06; H04W 60/04; H04W 48/04; H04W 76/50; H04W 28/06; H04W 28/02; H04W 4/24; H04W 76/10; H04L 12/1407; H04L 29/08; H04L 63/20; H04L 67/306; H04L 12/14; H04M 15/66; H04M 15/00
See application file for complete search history.

(56) References Cited

U.S. PATENT DOCUMENTS 10,609,667 B1 * 3/2020 Cakulev ............. H04L 41/0893
2004/0073928 A1 * 4/2004 Alakoski ............. H04L 12/1886
725/62

(Continued)

OTHER PUBLICATIONS

ETSI TS 123 501 V15.3.0 (Sep. 2018). Technical Specification. 5G; System Architecture for the 5G System (3GPP TS 23.501 version 15.3.0 Release 15). 227 pages.

(Continued)

*Primary Examiner* — Hanh N Nguyen

(57) ABSTRACT

A network device may include a memory storing instructions and processor configured to execute the instructions to receive a request for a session management (SM) policy association in relation to establishment of a packet data unit (PDU) session for a particular user equipment (UE) device; requesting, from a second network device, access and mobility (AM) policy decisions pertaining to the UE device; receiving AM policy decisions from the second network device, and creating the SM policy association based on at least the received AM policy decisions. The request for SM policy association includes an identifier associated with the second network device. The processor may be further configured to determine whether the network device is the same as the second network device based on the identifier; and transmit a request to the second network device when it is determined that the second network device is not the same as the first network device.

19 Claims, 9 Drawing Sheets

(51) Int. Cl.
  *H04L 12/14*     (2006.01)
  *H04W 76/10*    (2018.01)
  *H04L 29/06*     (2006.01)
  *H04W 60/04*    (2009.01)
  *H04L 29/08*     (2006.01)

(52) U.S. Cl.
  CPC ............ *H04L 67/306* (2013.01); *H04W 4/24* (2013.01); *H04W 60/04* (2013.01); *H04W 76/10* (2018.02)

(56) References Cited

U.S. PATENT DOCUMENTS

| | | | |
|---|---|---|---|
| 2020/0092424 A1* | 3/2020 | Qiao | H04M 15/66 |
| 2020/0195732 A1* | 6/2020 | Draznin | H04M 15/66 |
| 2020/0259904 A1* | 8/2020 | Dao | H04L 67/14 |
| 2020/0260401 A1* | 8/2020 | So | H04W 48/04 |
| 2020/0337093 A1* | 10/2020 | Kim | H04W 64/00 |
| 2020/0359440 A1* | 11/2020 | Qiao | H04W 76/12 |
| 2020/0396000 A1* | 12/2020 | Ryu | H04W 88/14 |

OTHER PUBLICATIONS

ETSI TS 123 502 V15.2.0 (Jun. 2018). Technical Specification. 5G; Procedures for the 5G System (3GPP TS 23.502 version 152.0 Release 15). 311 pages.
ETSI TS 123 503 V15.2.0 (Jul. 2018). Technical Specification. 5G; Policy and Charging Control Framework for the 5G System; Stage 2 (3GPP TS 23.503 version 15.2.0 Release 15). 70 pages.

* cited by examiner

US 11,064,422 B2

SYSTEM AND METHOD FOR ENABLING SUBSCRIBER-BASED POLICY DECISIONS

BACKGROUND INFORMATION

Wireless communication service providers continue to improve and expand available services as well as networks used to deliver such services. One aspect of such improvements includes the development of a core network having separate access management and session management functionality. That is, management of device access to the network is handled independently of the management of discrete data sessions occurring over the network. Facilitating coordination between access management and session management poses various challenges.

DETAILED DESCRIPTION OF PREFERRED EMBODIMENTS

The following detailed description refers to the accompanying drawings. The same reference numbers in different drawings identify the same or similar elements.

As communication networks and services increase in size, complexity, and number of users, management of the communication networks have become increasingly more complex. One way in which wireless access networks are continuing to become more complicated is by incorporating various aspects of next generation networks, such as 5$^{th}$ generation (5G) mobile networks, utilizing high frequency bands (e.g., 24 Gigahertz, 39 GHz, etc.) and/or lower frequency bands (e.g., sub 6 GHz), and a large number of antennas. 5G New Radio (NR) millimeter (mm) wave technology may provide significant improvements in bandwidth and/or latency over other wireless network technology. Furthermore, coverage and signal quality may be improved using multiple-input and multiple-output (MIMO) adaptive antenna arrays. Additionally, user equipment (UE) devices may also include multiple antennas to improve spectral efficiency.

For a UE device to acquire wireless service of a network, the UE device has to first establish a wireless connection (e.g., a Radio Resource Control (RRC) connection) with a radio access network (RAN), and may authenticate, register, and establish a bearer with a core network. Typically, as part of an attachment procedure with the core network, the UE device receives policies or policy decisions from the core network. For example, the policies may include a policy pertaining to route selection for outgoing traffic, a policy pertaining to network discovery and selection, a policy regarding acceptable service areas and available bandwidth, and policies relating to quality of service (QoS) requirements.

Unfortunately, depending on how the messaging between the network and the UE device is coordinated, the delivery of the policies can result in inconsistent application of different policies at different times. For example, an access and management function (AMF) may receive policy decisions relating to registration of the UE device (i.e., access and mobility (AM) policy decisions) from a policy control function (PCF) before a registration procedure is completed. Subsequently, during creation of a packet data unit (PDU) session, a session management function (SMF) may similarly receive policy decisions relating to session establishment (i.e., session management (SM) policy decisions) from a PCF. However, existing approaches do not ensure that AM policy decisions are shared with or otherwise available to the PCF making the SM policy decisions. Implementations described herein relate to ensuring consistency in the application of policies during both network access management and session management.

Figure 1:
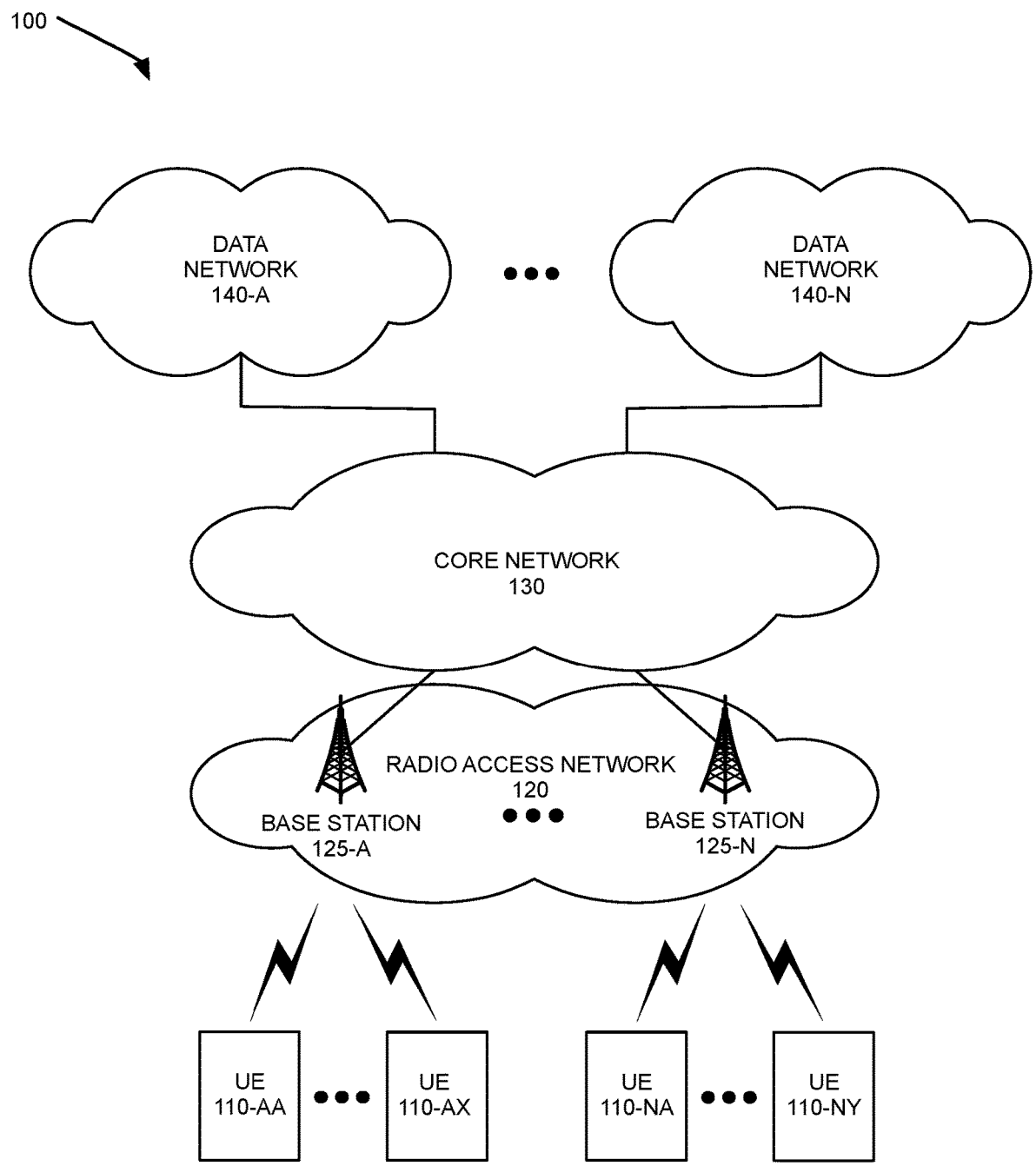
FIG. 1 is a diagram illustrating an environment according to an implementation described herein.

FIG. 1 is a diagram of an exemplary environment 100 in which the systems and/or methods, described herein, may be implemented. As shown in FIG. 1, environment 100 may include user equipment (UE) devices 110-AA to 110-NY (referred to herein collectively as "UE devices 110" and individually as "UE device 110"), a radio access network 120, a core network 130, and data networks 140-A to 140-N.

UE device 110 may include any device with long-range (e.g., cellular or mobile wireless network) wireless communication functionality. For example, UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer; a customer premises equipment (CPE) device, such as a set-top box or a digital media player (e.g., Apple TV, Google Chromecast, Amazon Fire TV, etc.), a WiFi access point, a smart television, etc.; a portable gaming system; a global positioning system (GPS) device; a home appliance device; a home monitoring device; and/or any other type of computer device with wireless communication capabilities and a user interface. UE device 110 may include capabilities for voice communication, mobile broadband services (e.g., video streaming, real-time gaming, premium Internet access etc.), best effort data traffic, and/or other types of applications.

In some implementations, UE device 110 may communicate using machine-to-machine (M2M) communication, such as machine-type communication (MTC), and/or another type of M2M communication.

Radio access network 120 may enable UE devices 110 to connect to core network 130 for mobile telephone service, Short Message Service (SMS) message service, Multimedia Message Service (MMS) message service, Internet access, cloud computing, and/or other types of data services. Radio access network 120 may include access devices 125-A to 125-N (referred to herein collectively as "access devices 125" and individually as "access device 125"). Each access device 125 may service a set of UE devices 110. For example, access device 125-A may service UE devices 110-AA to 110-AX, etc., to access device 125-N, which may service UE devices 110-NA to 110-NY. In other words, UE devices 110-AA to 110-AX may be located within the geographic area serviced by access device 125-A, and other UE devices 110 may be serviced by another access device 125.

Access device 125 may include a 5G access device (e.g., a gNodeB) that includes one or more radio frequency (RF) transceivers (also referred to as "cells" and/or "access device sectors") facing particular directions. In some implementations, access device 125 may also include a 4G access device (e.g., an eNodeB). Furthermore, in some implementations, access device 125 may include a mobile edge computing (MEC) system that performs cloud computing and/or network processing services for UE devices 110.

Core network 130 may manage communication sessions for UE devices 110. For example, core network 130 may establish an Internet Protocol (IP) connection between UE device 110 and a particular data network 140. Furthermore, core network 130 may enable UE device 110 to communicate with an application server, and/or another type of device, located in a particular data network 140 using a communication method that does not require the establishment of an IP connection between UE device 110 and data network 140, such as, for example, Data over Non-Access Stratum (DoNAS).

In some implementations, core network 130 may include a Long Term Evolution (LTE) access network (e.g., an evolved packet core (EPC) network). In other implementations, core network 130 may include a Code Division Multiple Access (CDMA) access network. For example, the CDMA access network may include a CDMA enhanced High Rate Packet Data (eHRPD) network (which may provide access to an LTE access network).

Furthermore, core network 130 may include an LTE Advanced (LTE-A) access network and/or a 5G core network or other advanced network that includes functionality such as management of 5G NR access devices; carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; MTC functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality.

Data networks 140-A to 140-N (referred to herein collectively as "data networks 140" and individually as "data network 140") may each include a packet data network. A particular data network 140 may include, and/or be connected to and enable communication with, a local area network (LAN), a wide area network (WAN), a metropolitan area network (MAN), an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks. Some or all of a particular data network 140 may be managed by a communication services provider that also manages core network 130, radio access network 120, and/or particular UE devices 110. For example, in some implementations, a particular data network 140 may include an IP Multimedia Sub-system (IMS) network (not shown in FIG. 1). An IMS network may include a network for delivering IP multimedia services and may provide media flows between two different UE devices 110, and/or between a particular UE device 110 and external IP networks or external circuit-switched networks (not shown in FIG. 1).

Although FIG. 1 shows exemplary components of environment 100, in other implementations, environment 100 may include fewer components, different components, differently arranged components, or additional components than depicted in FIG. 1. Additionally or alternatively, one or more components of environment 100 may perform functions described as being performed by one or more other components of environment 100.

Figure 2A:
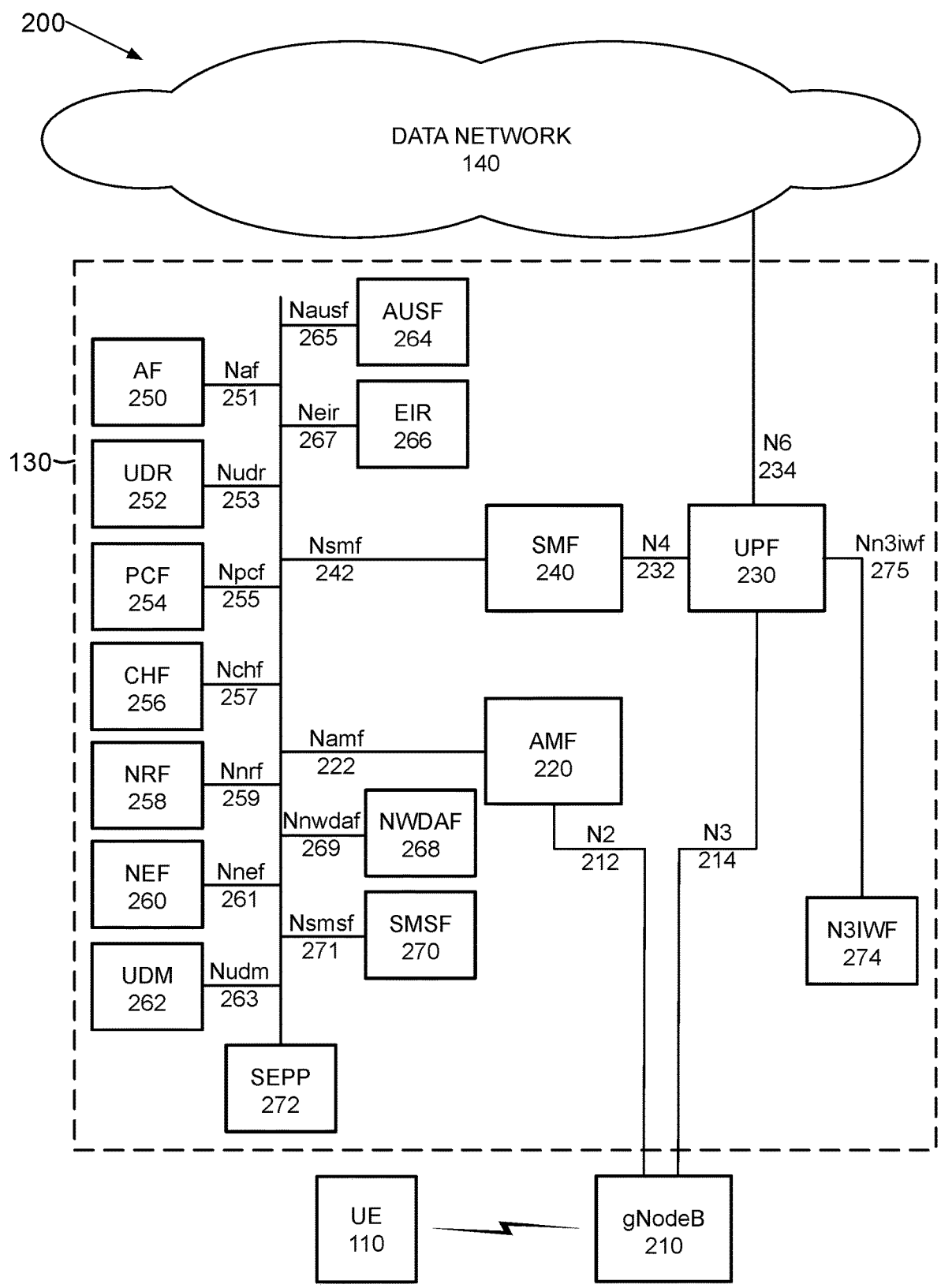
FIG. 2A is a diagram illustrating exemplary components of the core network of FIG. 1.

FIG. 2A is a diagram illustrating a system 200 that includes exemplary components of core network 130 in the context of environment 100 according to an implementation described herein. As shown in FIG. 2A, system 200 may include UE device 110, gNodeB 210, core network 130, and data network 140.

gNodeB 210 (corresponding to access device 125) may include one or more devices (e.g., access devices) and other components and functionality that enable UE device 110 to wirelessly connect to access network 120 using 5G NR Radio Access Technology (RAT). For example, gNodeB 210 may service one or more cells, with each cell being served by a wireless transceiver with an antenna array configured for mm-wave wireless communication. gNodeB 210 may correspond to access device 125. gNodeB 210 may communicate with an Access and Mobility Function (AMF) 220 using an N2 interface 212 and communicate with a User Plane Function (UPF) 230 using an N3 interface 214.

Core network 130 may include AMF 220, UPF 230, a SMF 240, an Application Function (AF) 250, a Unified Data Repository (UDR) 252, a Policy Control Function (PCF) 254, a Charging Function (CHF) 256, a Network Repository Function (NRF) 258, a Network Exposure Function (NEF) 260, a Unified Data Management (UDM) 262, an Authentication Server Function (AUSF) 264, a 5G Equipment Identity Register (EIR) 266, a Network Data Analytics Function (NWDAF) 268, a Short Message Service Function (SMSF) 270, a Security Edge Protection Proxy (SEPP) 272, and a Non-3GPP Inter-Working Function (N3IWF) 274.

Figure 2B:
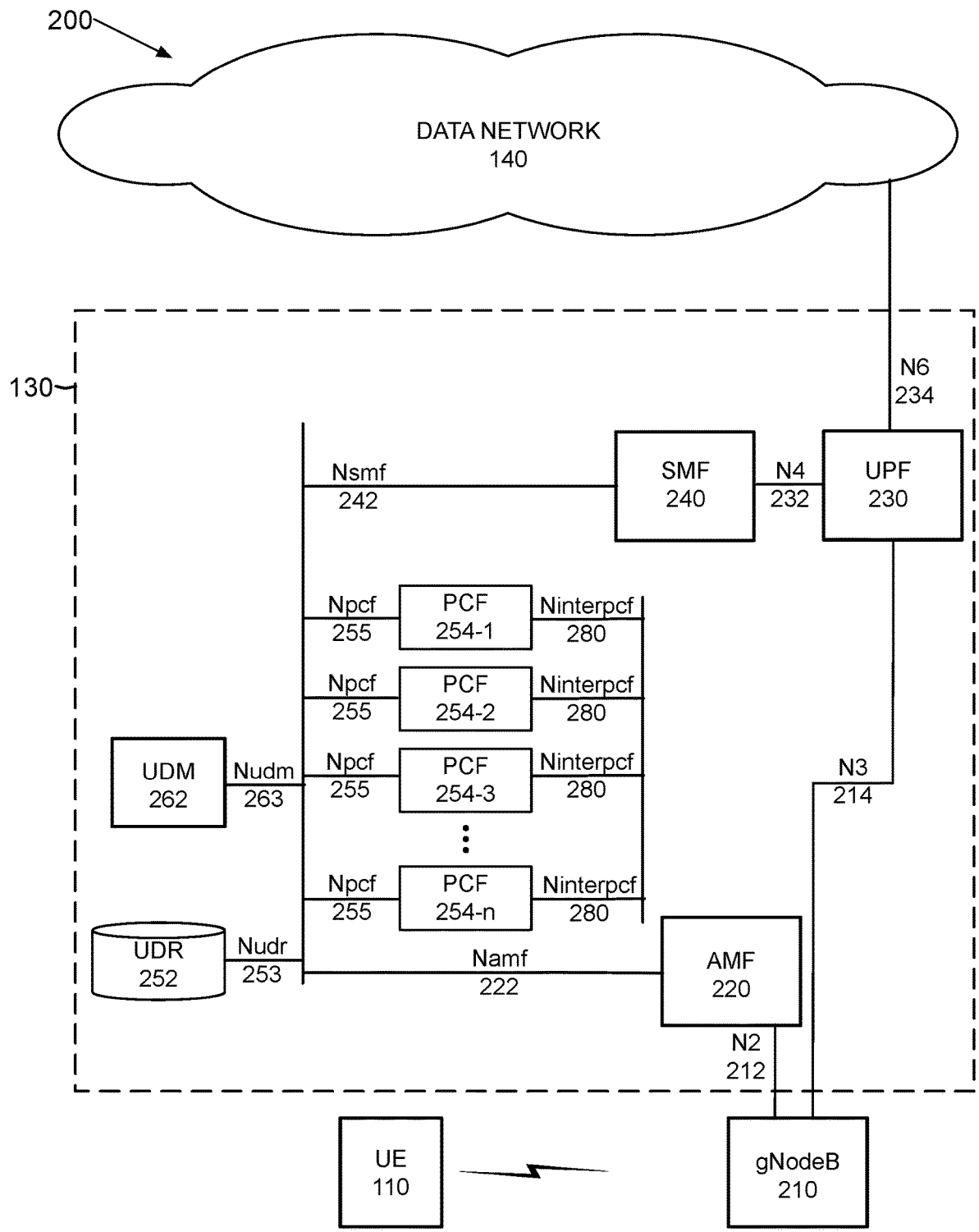
FIG. 2B is a diagram illustrating portions of the network of FIG. 2A, according to an implementation described herein.

The components depicted in FIGS. 2A and 2B may be implemented as dedicated hardware components or as virtualized functions implemented on top of a common shared physical infrastructure using software-defined networking (SDN). For example, an SDN controller may implement one or more of the components of FIG. 2A using an adapter implementing a virtual network function (VNF) virtual machine, an event driven serverless architecture interface, and/or another type of SDN architecture. The common shared physical infrastructure may be implemented using one or more devices 300 described below with reference to FIG. 3 in a cloud computing center associated with core network 130. Additionally, or alternatively, some, or all, of the common shared physical infrastructure may be implemented using one or more devices 300 described below with reference to FIG. 3 using a MEC system associated with access devices 125.

AMF 220 may perform registration management, connection management, reachability management, mobility management, lawful intercepts, SMS transport between UE device 110 and an SMSF 270, session management messages transport between UE device 110 and SMF 240, access authentication and authorization, location services management, functionality to support non-3GPP access networks, and/or other types of management processes. AMF 220 may be accessible by other function nodes via an Namf interface 222.

UPF 230 may maintain an anchor point for intra/inter-RAT mobility, maintain an external Packet Data Unit (PDU) point of interconnect to a particular data network 140, perform packet routing and forwarding, perform the user plane part of policy rule enforcement, perform packet inspection, perform lawful intercept, perform traffic usage reporting, perform QoS handling in the user plane, perform uplink traffic verification, perform transport level packet marking, perform downlink packet buffering, forward an "end marker" to a Radio Access Network node (e.g., gNodeB 210), and/or perform other types of user plane processes. UPF 230 may communicate with SMF 240 using an N4 interface 232 and connect to data network 140 using an N6 interface 234.

SMF 240 may perform session establishment, session modification, and/or session release, perform IP address allocation and management, perform Dynamic Host Configuration Protocol (DHCP) functions, perform selection and control of UPF 230, configure traffic steering at UPF 230 to guide the traffic to the correct destinations, terminate interfaces toward PCF 254, perform lawful intercepts, charge data collection, support charging interfaces, control and coordinate of charging data collection, terminate session management parts of NAS messages, perform downlink data notification, manage roaming functionality, and/or perform other types of control plane processes for managing user plane data. SMF 240 may be accessible via an Nsmf interface 242.

AF 250 may provide services associated with a particular application, such as, for example, an application for influencing traffic routing, an application for accessing NEF 260, an application for interacting with a policy framework for policy control, and/or other types of applications. AF 250 may be accessible via an Naf interface 251.

UDR 252 provides a unified data structure that is accessible to a number of functional elements. For example, UDR 252 may support storage and retrieval of subscription data by UDM 262, storage and retrieval of policy data by PCF 254, storage and retrieval of structured data for exposure, and application data by NEF 260. UDR 252 may be accessible via a Nudr interface 253.

PCF 254 may support policies to control network behavior, provide policy rules to control plane functions (e.g., to SMF 240), access subscription information relevant to policy decisions, perform policy decisions, and/or perform other types of processes associated with policy enforcement. PCF 254 may be accessible via Npcf interface 255. CHF 256 may perform charging and/or billing functions for core network 130. CHF 256 may be accessible via Nchf interface 257.

NRF 258 may support a service discovery function and maintain profiles of available network function (NF) devices/instances and their supported services. An NF profile may include an NF instance identifier (ID), an NF type, a Public Land Mobile Network (PLMN) ID associated with the NF, network slice IDs associated with the NF, capacity information for the NF, service authorization information for the NF, supported services associated with the NF, endpoint information for each supported service associated with the NF, and/or other types of NF information. Additionally, NRF 258 may include one or more transport network KPIs associated with the NF device/instance. NRF 258 may be accessible via an Nnrf interface 259.

NEF 260 may expose capabilities and events to other NFs, including $3^{rd}$ party NFs, AFs, edge computing NFs, and/or other types of NFs. Furthermore, NEF 258 may secure provisioning of information from external applications to core network 130, translate information between core network 130 and devices/networks external to core network 130, support a Packet Flow Description (PFD) function, and/or perform other types of network exposure functions. NEF 260 may be accessible via Nnef interface 261.

UDM 262 may maintain subscription information for UE devices 110, manage subscriptions, generate authentication credentials, handle user identification, perform access authorization based on subscription data, perform network function registration management, maintain service and/or session continuity by maintaining assignment of SMF 240 for ongoing sessions, support SMS delivery, support lawful intercept functionality, and/or perform other processes associated with managing user data. UDM 262 may be accessible via a Nudm interface 263.

AUSF 264 may perform authentication. For example, AUSF 264 may implement an Extensible Authentication Protocol (EAP) authentication server and may store authentication keys for UE devices 110. AUSF 264 may be accessible via Nausf interface 265. EIR 266 may authenticate a particular UE device 110 based on UE device identity, such as a Permanent Equipment Identifier (PEI). For example, EIR 266 may check to see if a PEI has been blacklisted. EIR 266 may be accessible via Neir interface 267.

NWDAF 268 may collect analytics information associated with radio access network 120 and/or core network 130. For example, NWDAF 268 may collect accessibility KPIs (e.g., an RRC setup success rate, a RAB success rate, etc.), retainability KPIs (e.g., a call drop rate, etc.), mobility KPIs (e.g., a handover success rate, etc.), service integrity KPIs (e.g., downlink average throughput, downlink maximum throughput, uplink average throughput, uplink maximum throughput, etc.), utilization KPIs (e.g., resource block utilization rate, average processor load, etc.), availability KPIs (e.g., radio network unavailability rate, etc.), traffic KPIs (e.g., downlink traffic volume, uplink traffic volume, average number of users, maximum number of users, a number of voice bearers, a number of video bearers, etc.), response time KPIs (e.g., latency, packet arrival time, etc.), and/or other types of wireless network KPIs.

SMSF 270 may perform SMS services for UE devices 110. SMSF 270 may be accessible via Nsmsf interface 271. SEPP 272 may implement application layer security for all layer information exchanged between two NFs across two different PLMNs. N3IWF 274 may interconnect to a non-3GPP access device, such as, for example, a WiFi access point (not shown in FIG. 2). N3IWF 274 may facilitate handovers for UE device 110 between radio access network 120 and the non-3GPP access device. N3IWF 274 maybe accessible via Nn3iwf interface 275.

While FIG. 2A depicts a single AMF 220, UPF 230, SMF 240, AF 250, UDR 252, PCF 254, CHF 256, NRF 258, NEF 260, UDM 262, AUSF 264, EIR 266, NWDAF 268, SMSF 270, SEPP 272, and N3IWF 274 for illustration purposes, in practice, core network 130 may include multiple AMFs 220, UPFs 230, SMFs 240, AFs 250, UDRs 252, PCFs 254, CHFs 256, NRFs 258, NEFs 260, UDMs 262, AUSFs 264, EIRs 266, NWDAFs 268, SMSFs 270, SEPPs 272, and/or N3IWFs 274. In particular, FIG. 2B illustrates a portion of core network 130 that includes a plurality of PCFs 254, identified as PCFs 254-1 to 254-*n*. For example, PCFs 254-1 to 254-*n* may be distributed throughout core network 130, e.g., geographically or logically to service the needs of subscribers. To fully accommodate required functionality, each of AMF 220 and SMF 240 may identify and select, possibly uniquely, a respective PCF 254. For AMF 220, a particular PCF 254 may be selected based, for example, on the available PCF instances obtained from NRF or locally configured information in the AMF, depending on operator's policies.

For SMF 240, selection of a particular PCF 254 may be based on local operator policies, a selected Data Network Name (DNN), the network slice selection information for the particular PDU Session being established, the subscription identifier range, etc. Consequently, for a given PDU session, AMF 220 and SMF 240 may each select a respective PCF 254. In many instances, such independent selections are not only not problematic, but are advantageous to the function-based operation of core network 130. However, in some instances, information regarding subscriber policies and their application by both AMF 220 and SMF 240 are uniformly identified and applied.

In particular, subscriber-based session management policy decisions performed by one PCF 254 (e.g., selected by SMF 240) may not be based on access mobility or UE policy decisions determined by another PCF 254 (e.g., selected by AMF 220). Examples of such decisions may include higher or lower PDU session aggregate maximum bit rate (AMBR) decisions or different charging rate decisions based on the allowed/restricted tracking area identities (TAIs) provided to AMF 220 during registration.

Consistent with implementations described herein, each PCF 254 may communicate with other PCFs 254 via a Ninterpcf service-based interface 280, multiple ones of which are depicted in FIG. 2B. More specifically, a PCF 254 selected by SMF 240 for a particular PDU session may request and retrieve policy decisions from the PCF 254 selected by AMF 220 via, for example, a PCF Policy service. In practice, given that the AMF 220 is instrumental in both access and mobility management-related PCF selection as well as selection of a suitable SMF 240 for handing a requested PDU session, information identifying the PCF 254 (e.g., its PCF ID) selected for AM policies is known to AMF 220 and, consistent with embodiments described herein, may be shared with SMF 240 during selection. SMF 240 then includes the PCF ID for the AMF-selected PCF 254 when selecting a PCF for session management-related functions.

Although FIGS. 2A and 2B show exemplary components of core network 130, in other implementations, core network 130 may include fewer components, different components, differently arranged components, or additional components than depicted in FIGS. 2A and 2B. Additionally or alternatively, one or more components of core network 130 may perform functions described as being performed by one or more other components of core network 130. For example, core network 130 may include additional function nodes not shown in FIGS. 2A and 2B, such as a Network Slice Selection Function (NSSF), an Unstructured Data Storage Network Function (UDSF), a Location Management Function (LMF), a Lawful Intercept Function (LIF), a binding session function (BSF), and/or other types of functions. Furthermore, while particular interfaces have been described with respect to particular function nodes in FIG. 2A, additionally, or alternatively, core network 130 may include a reference point architecture that includes point-to-point interfaces between particular function nodes.

Figure 3:
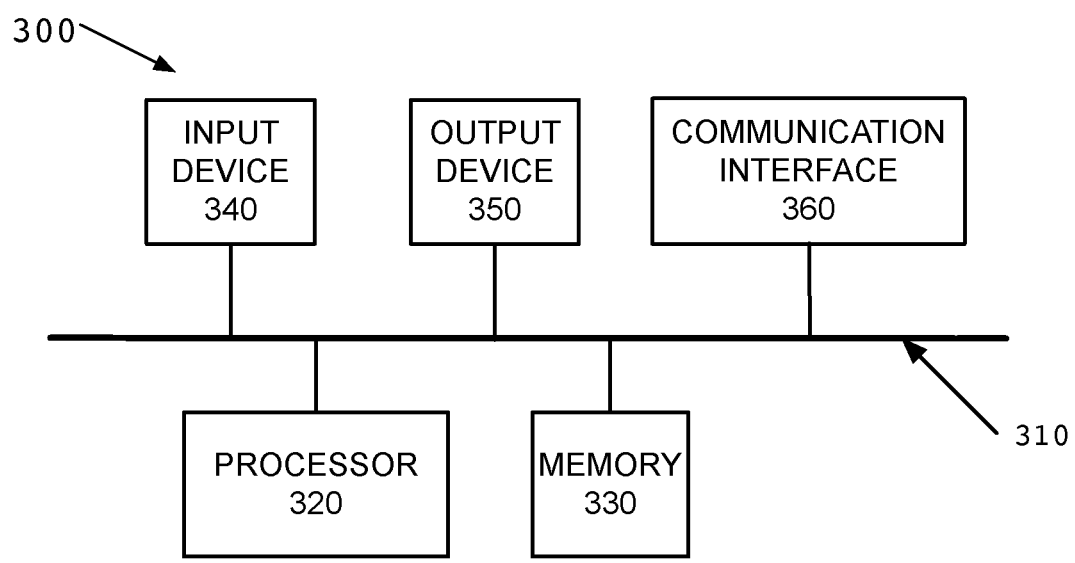
FIG. 3 is a diagram illustrating exemplary components of a device that may be included in a component of FIG. 1, FIG. 2A, or FIG. 2B according to an implementation described herein.

FIG. 3 is a diagram illustrating example components of a device 300 according to an implementation described herein. UE device 110, gNodeB 210, AMF 220, UPF 230, SMF 240, AF 250, UDM 252, PCF 254, CHF 256, NRF 258, NEF 260, NSSF 262, AUSF 264, EIR 266, NWDAF 268, SMSF 270, SEPP 272, N3IWF 274, and/or other components of core network 130, may each include one or more devices 300. As shown in FIG. 3, device 300 may include a bus 310, a processor 320, a memory 330, an input device 340, an output device 350, and a communication interface 360.

Bus 310 may include a path that permits communication among the components of device 300. Processor 320 may include any type of single-core processor, multi-core processor, microprocessor, latch-based processor, and/or processing logic (or families of processors, microprocessors, and/or processing logics) that interprets and executes instructions. In other embodiments, processor 320 may include an application-specific integrated circuit (ASIC), a field-programmable gate array (FPGA), and/or another type of integrated circuit or processing logic.

Memory 330 may include any type of dynamic storage device that may store information and/or instructions, for execution by processor 320, and/or any type of non-volatile storage device that may store information for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 340 may allow an operator to input information into device 300. Input device 340 may include, for example, a keyboard, a mouse, a pen, a microphone, a remote control, an audio capture device, an image and/or video capture device, a touch-screen display, and/or another type of input device. In some embodiments, device 300 may be managed remotely and may not include input device 340. In other words, device 300 may be "headless" and may not include a keyboard, for example.

Output device 350 may output information to an operator of device 300. Output device 350 may include a display, a printer, a speaker, and/or another type of output device. For example, device 300 may include a display, which may include a liquid-crystal display (LCD) for displaying content to the customer. In some embodiments, device 300 may be managed remotely and may not include output device 350. In other words, device 300 may be "headless" and may not include a display, for example.

Communication interface 360 may include a transceiver that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to radio frequency (RF) signals and/or a receiver that converts RF signals to baseband signals. Communication interface 360 may be coupled to one or more antennas/antenna arrays for transmitting and receiving RF signals.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a WiFi) card for wireless communications. Communication interface 360 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 300 may perform certain operations relating to inter-PCF communications relating to subscriber-based policy decisions. Device 300 may perform these operations in response to processor 320 executing software instructions contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, additional components, or differently arranged components than depicted in FIG. 3. Additionally, or alternatively, one or more components of device 300 may perform one or more tasks described as being performed by one or more other components of device 300.

Figure 4:
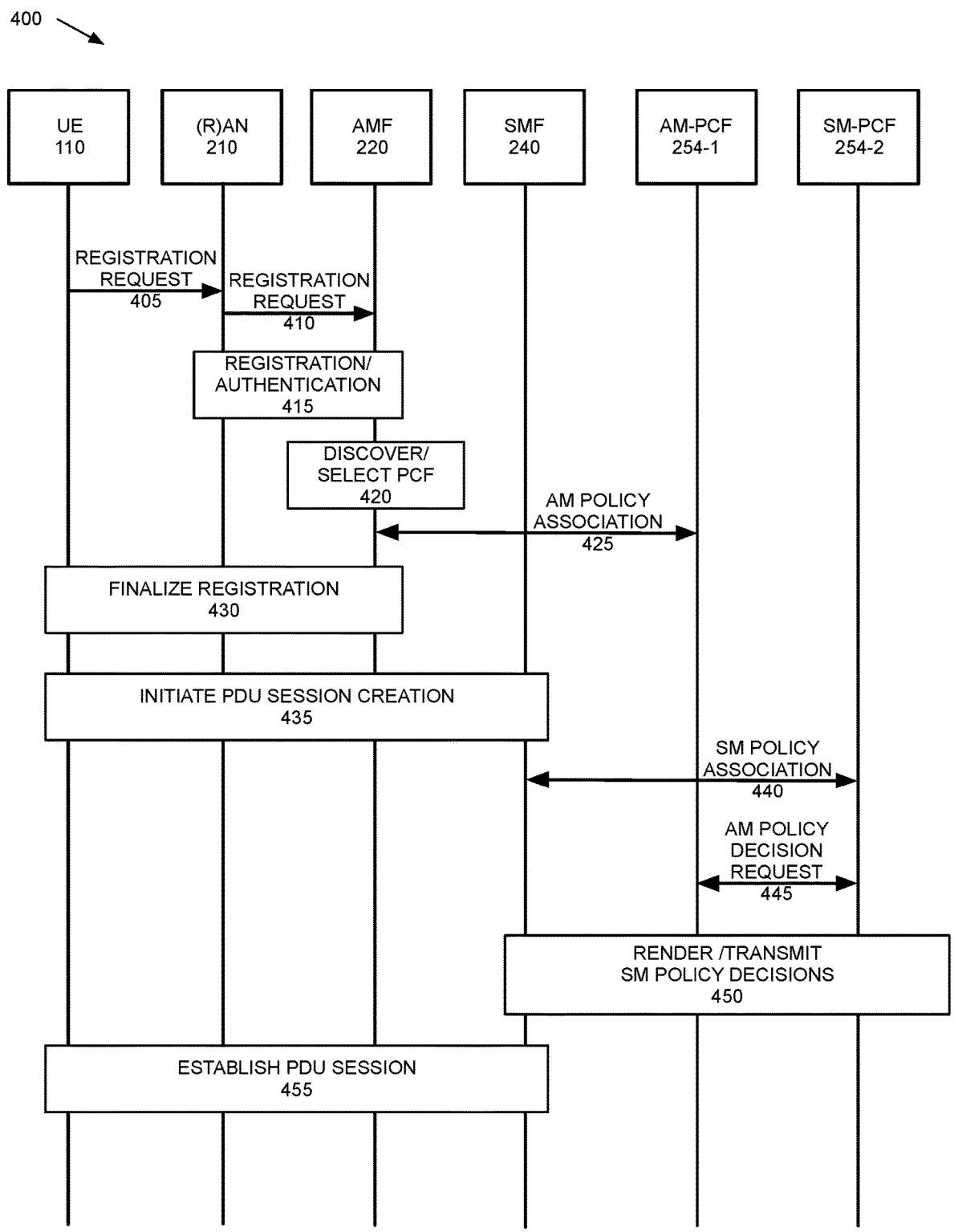
FIG. 4 is a diagram of an exemplary signal flow according to an implementation described herein.

FIG. 4 is a diagram of an exemplary signal flow 400 that depicts exemplary interactions between a portion of the components of core network 130 described above in accordance with FIGS. 2A and 2B. It should be understood that the signaling depicted in FIG. 4 is abbreviated to highlight concepts described herein and that, in practice, additional signals/messages beyond those shown in FIG. 4 are exchanged between network functions to provide network services. As shown in FIG. 4, signal flow 400 may include UE device 110 (also referred to herein as UE 110) exchanging registration request signaling with (R)AN 210 (e.g., gNodeB 210) (signal 405). For example, UE 110 may initiate Radio Resource Control (RRC) session establishment with gNodeB 210. In response, (R)AN 210 may select and register UE 110 with an appropriate AMF 220 (signal 410). For example, gNodeB 210 may initiate an AMF selection process. Using the selected AMF 220, (R)AN 210 and AMF 220 perform registration and authentication processing (signal 415). For example, AMF 220 may select an appropriate AUSF 264 (not shown in FIG. 4) and may authenticate the registration request from UE 110 using the selected AUSF 264.

Following authentication, AMF 220 may discover and select a PCF 254 (referred to as AM-PCF 254-1) in the manner briefly described above (signal 420). Using the selected PCF 254-1, AMF 220 may initiate AM and/or UE policy enforcement via Npcf interface 255 (signal 425). For example, AMF 220 may request creation of an AM policy control association in AM-PCF 254-1 (referred to as Npcf_AMPolicyControl_Create) for the requesting UE 110. Such a request may include various UE-related and/or subscriber information, such as its subscription permanent identifier (SUPI), Internal Group identifier, subscription notification indication, Service Area Restrictions, RAT/frequency selection priority (RFSP) index, Allowed network slice selection assistance information (NSSAI), general public subscription identifier (GPSI), Access Type and RAT, permanent equipment identifier (PEI), time zone, and the UE Policy Container (i.e., a list of stored PSIs). In response AM-PCF 254-1 retrieves policy subscription information corresponding to the identified UE and transmits a decision regarding access back to AMF 220. AMF 220 then deploys or enforces the received decision, AM policy when determining whether to register UE 110. Assuming that an affirmative policy decision is received by AMF 220 (for the purposes of FIG. 4), AMF 220, (R)AN 210 and UE 110 finalize registration of UE 110 onto the core network 130 (signal 430).

As shown in FIG. 4, once UE 110 is registered, a PDU session must be established (or re-established) to enable data to flow between UE 110 and data network 140. Such a PDU session creation process is illustrated at element 435 in FIG. 4 and includes, among other things, selection of a suitable SMF 240 by AMF 220 and selection of a suitable PCF 254 by SMF 240. Such a suitable PCF 254 is identified in FIG. 4 as SM-PCF 254-2.

As described above, current standards do not require that AMF 220 and SMF 240 select a same PCF 254. However, consistent with known standards, AMF 220 does provide a PCF identifier to SMF 240 during PDU session establishment. Based on various criteria, such as operator policies, SMF 240 may determine whether to use the identified PCF for session management (SM) policy decisions. For the purposes of this description, it is assumed that SMF 240 has determined to not use the identified PCF 254 (i.e., AM-PCF 254-1) for SM policy determination.

As part of its policy framework, SMF 240 is configured to create associations between the PDU session being established and any SM policies that may apply to the particular PDU session. Such associations are established by SMF 240 querying SM-PCF 254-2 for applicable SM policy decisions (signal 440). Such a request may include various elements of information, such as: SUPI, PDU Session id, PDU Session Type, DNN, Access Type, AMF instance identifier, UE network address, PEI, User Location Information, Time Zone, Serving Network, RAT type, Charging Characteristics, Session AMBR, default QoS information, Internal and Group Identifier.

Consistent with implementations described herein, in addition to the policy rules themselves, which may be stored within or otherwise available to SM-PCF 254-2, and the information received from SMF 240, SM-PCF 254-2 may also determine the content of some or all of the AM policy decisions made by AM-PCF 254-1. As shown in FIG. 4, in response to a request for SM policy decisions received from SMF 240, SM-PCF 254-2 may transmit a request for relevant AM policy decisions to AM-PCF 254-1 via Ninterpcf interface 280 (signal 445). As described above, an identification of the relevant AM-PCF 254-1 is provided by to SMF 240 by AMF 220 during PDU session establishment. Consistent with embodiments described herein, such identification information may be similarly provided to SM-PCF 254-2 in policy decision request 445. By way of example, an AM policy decision from AM-PCF 254-1 relating to allowed or restricted tracking area identifiers (TAIs) may be used by SM-PCF 254-2 to establish higher or lower AMBR or charging rates.

Based on the SM policies identified for enforcement as well as any AM policy decisions received from AM-PCF 254-1, SM-PCF 254-2 may render appropriate SM policy decisions (element 450) and transmit such decisions to SMF 240. Based on these decisions, the PDU session may (or may not) be established by SMF 240 (element 455).

Figure 5:
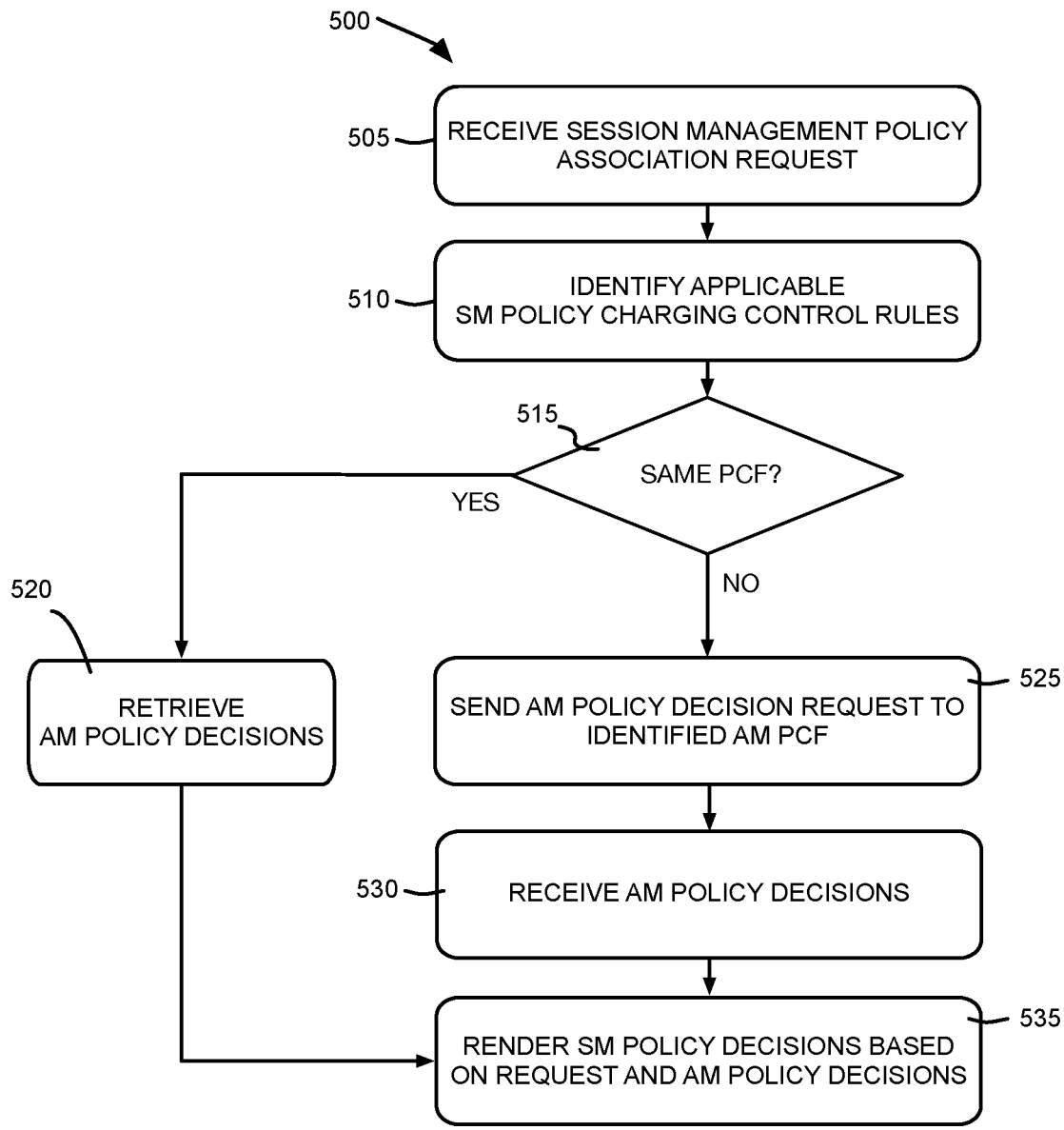
FIG. 5 is a flowchart of a process for implementing an inter-policy control function (PCF) communication according to an implementation described herein.

FIG. 5 is a flowchart of a process 500 for providing inter-PCF policy communications according to an implementation described herein. In some implementations, the process of FIG. 5 may be performed by PCF 254, such as PCF 254-2. In other implementations, some or all of the process of FIG. 5 may be performed by another device or a group of devices separate from PCF 254.

The process of FIG. 5 may include receiving a SM policy association request via Npcf interface 255 (Npcf_SMPolicyControl_Create) from SMF 240 in relation to a PDU session establishment request for a particular UE 110 (block 505). For example, as described above, following receipt of a registration request by AMF 220 from a UE 110 (via (R)AN 120), AMF 220 may discover and select an appropriate SMF 240 and may initiate a PDU session with SMF 240 on behalf of the UE 110. As part of this request, SMF 240 discovers (e.g., from NRF 258) and selects a PCF 254 (e.g., PCF 254-2) and transmits the Npcf_SMPolicyControl_Create request to the selected PCF. The Npcf_SMPolicyControl_Create request may include various elements relating to UE 110 and the requested PDU session, such as the subscriber's SUPI, the PDU session ID, the DNN, and the S-NSSAI, among other information. Consistent with embodiments described herein, the SM policy association request may also include the PCF ID relating to PCF 254 selected and used by AMF 220 during UE registration, as described above.

Upon receipt of the SM policy association request from SMF 240, PCF 254 identifies any applicable session management-related Policy Charging Control (PCC) rules (block 510). For example, PCF 254 may query a local repository of PCC rules. Alternatively, PCF 254 may retrieve the PCC rules from UDR 252, or other similar storage device shared between PCFs 254.

Consistent with embodiments described herein, PCF 254 also determines whether it is the same PCF 254 as that selected by AMF 220 during UE registration (block 515). For example, PCF 254-2 may determine whether the PCF ID received from SMF 240 indicating the PCF 254 selected and used by AMF 220 matches the PCF ID of the PCF 254-2. In other words, the PCF selected by SMF 240 determines whether it is the same as the PCF selected by the AMF 240. If so (block 515-YES), PCF 254-2 retrieves any AM policy decisions made during registration of UE 110 (block 520).

If it is determined that PCF 254-2 is not the same as PCF 254-1 selected by AMF 220 (block 515-NO), PCF 254-2 sends an AM policy decision request to PCF 254-1 selected by AMF 220 during UE registration (block 525). As described above, the PCF 254 selected by SMF 240 and making the SM policy association request receives the PCF ID for the PCF used by AMF 220. AM policy decision request may be based on this PCF ID and may further include information identifying the particular PDU session that is being established as well as information identifying the subscriber, such as the SUPI, the PDU Session ID, the DNN, etc., all of which are available to PCF 254. In response, PCF 254-1 (i.e., the AM-PCF) returns the requested AM policy decisions relating to the registered UE/subscriber, which are then received by PCF 254-2 (block 530). The SMF selected PCF, renders SM policy decisions based on the received AM policy decisions, as well as any other PCC rules identified for the particular PDU session being created (block 535).

Figure 6:
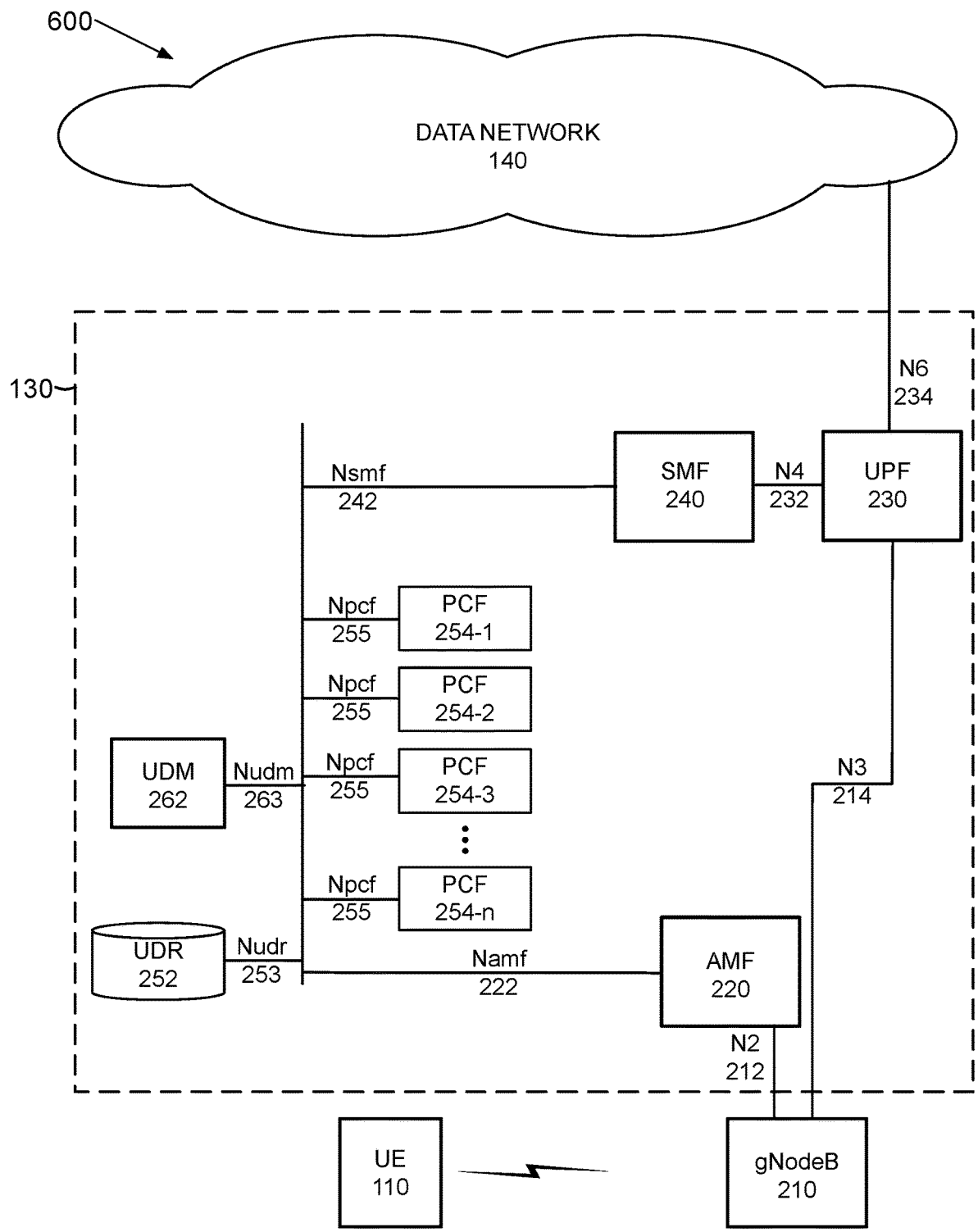
FIG. 6 is a diagram illustrating portions of the network of FIG. 2A, according to an implementation described herein.

FIG. 6 illustrates a system 600 consistent with another implementation of concepts described herein. As shown in FIG. 6, unlike the embodiment of FIG. 2B, network 130 does not include Ninterpcf interfaces between PCFs 254-1 to 254-n. In contrast, and as described below, communication of AM policy decisions is made via UDR 252.

Figure 7:
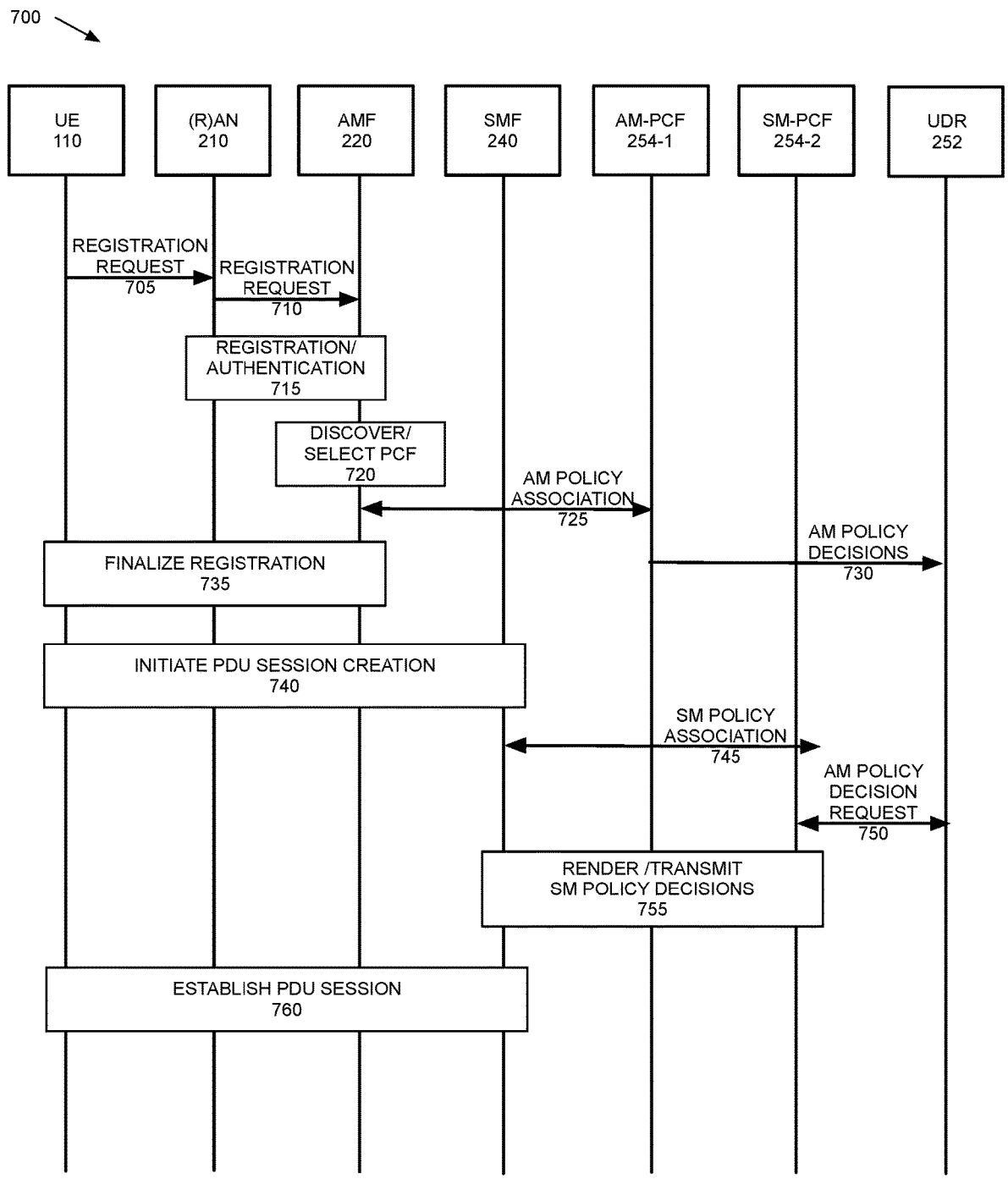
FIG. 7 is a diagram of an exemplary signal flow according to another implementation described herein.

FIG. 7 is a diagram of an exemplary signal flow 700 that depicts exemplary interactions between a portion of the components of core network 130 described above in accordance with FIG. 6. It should be understood that the signaling depicted FIG. 7 is abbreviated to highlight concepts described herein and that, in practice, additional signals/messages beyond those shown in FIG. 6 are exchanged between network functions to provide network services. As shown in FIG. 7, signal flow 700 may include UE 110 exchanging registration request signaling with (R)AN 210 (e.g., gNodeB 210) (signal 705). For example, UE 110 may initiate Radio Resource Control (RRC) session establishment with gNodeB 210. In response, (R)AN 210 may select and register UE 110 with an appropriate AMF 220 (signal 710). For example, gNodeB 210 may initiate an AMF selection process. Using the selected AMF 220, (R)AN 210 and AMF 220 perform registration and authentication processing (signal 715). For example, AMF 220 may select an appropriate AUSF 264 (not shown in FIG. 7) and may authenticate the registration request from UE 110 using the selected AUSF 264.

Following authentication, AMF 220 may discover and select a PCF 254 (referred to as AM-PCF 254-1) in the manner briefly described above in relation to FIG. 2B (signal 720). Using the selected PCF 254-1, AMF 220 may initiate AM and/or UE policy enforcement via Npcf interface 255 (signal 725). For example, AMF 220 may request creation of an AM policy control association in AM-PCF 254-1 (referred to as AM Policy Association in FIG. 7) for the requesting UE 110. In response, AM-PCF 254-1 retrieves policy subscription information corresponding to the identified UE and transmits a decision regarding access back to AMF 220.

Figure 8:
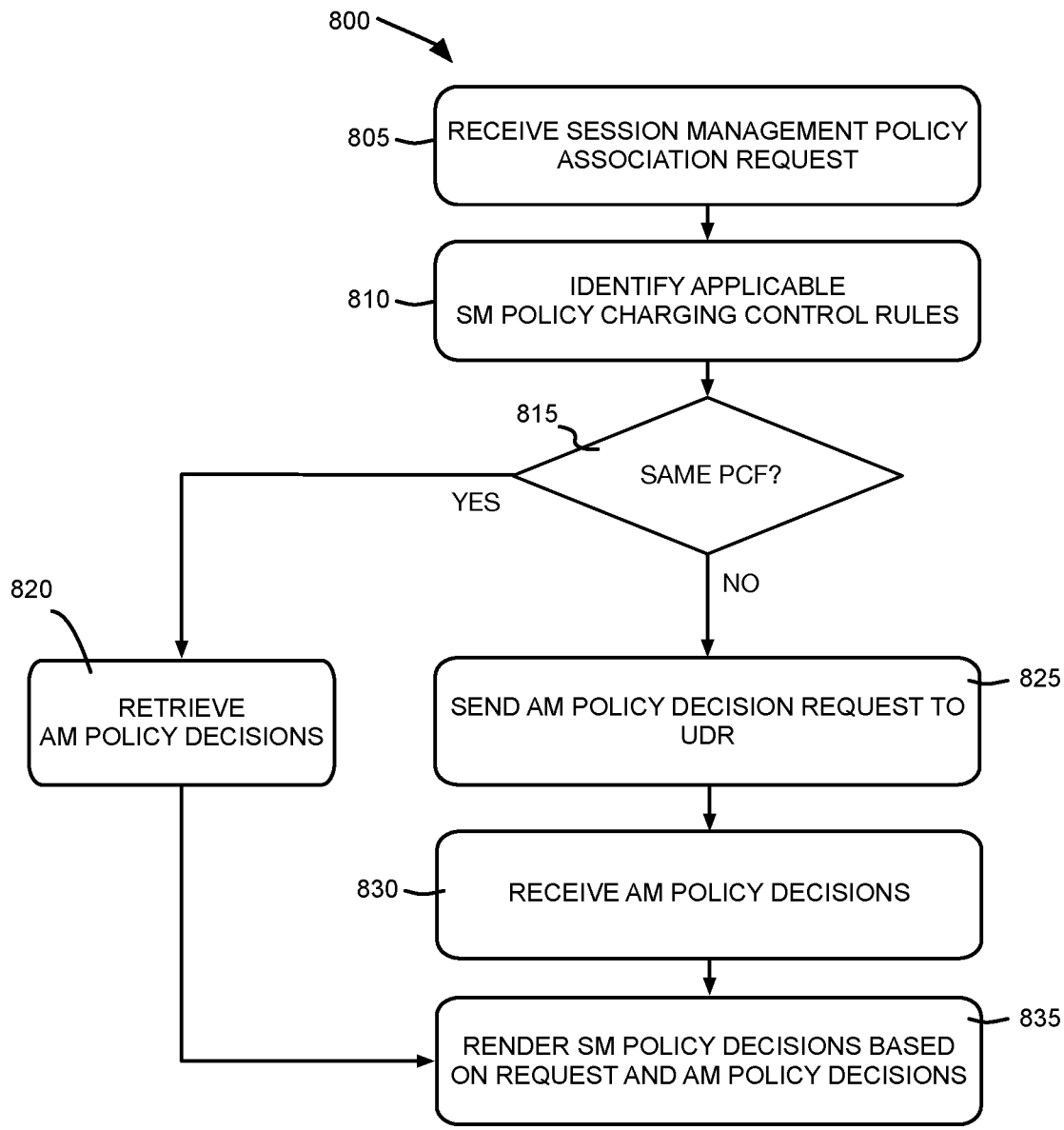
FIG. 8 is a flowchart of a process for implementing an inter-PCF communication according to another implementation described herein.

Consistent with the embodiment of FIGS. 6-8, AM-PCF 254-1 also transmits the AM policy decisions to UDR 252, via Nudr interface 253 (signal 730). UDR 252 may store the received policy decisions in any suitable manner and in combination with any available identification information, such as the SUPI associated with the registering UE, etc. As described below, subsequently received requests from one or more SM-PCFs 254 may retrieve the stored AM policy decisions.

Returning to FIG. 7, AMF 220 enforces the received AM policy decisions when determining whether to register UE 110. Assuming that an affirmative policy decision is received by AMF 220 (for the purposes of FIG. 7), AMF 220, (R)AN 210 and UE 110 finalize registration of UE 110 onto the core network 130 (signal 735). Once UE 110 is registered, a PDU session must be established (or re-established) to enable data to flow between UE 110 and data network 140. Such a PDU session creation process is illustrated at element 740 in FIG. 7 and includes, among other things, selection of a suitable SMF 240 by AMF 220 and selection of a suitable PCF 254 by SMF 240. Such a suitable PCF 254 is identified in FIG. 7 as SM-PCF 254-2.

As described above, AMF 220 provides a PCF identifier to SMF 240 during PDU session establishment. For the purposes of this description, it is assumed that SMF 240 has determined to not use the identified PCF 254 (i.e., AM-PCF 254-1) for SM policy determination.

In response to PDU session creation request, SMF 240 is configured to create associations between the PDU session being established and any SM policies that may apply to the particular PDU session. Such associations are established by SMF 240 querying SM-PCF 254-2 for applicable SM policy decisions, referred to as SM Policy Association in FIG. 7 (signal 745). Such a request may include various elements of information, such as: SUPI, PDU Session id, PDU Session Type, DNN, Access Type, AMF instance identifier, UE network address, PEI, User Location Information, Time Zone, Serving Network, RAT type, Charging Characteristics, Session AMBR, default QoS information, Internal and Group Identifier.

Consistent with implementations described herein, in addition to the policy rules themselves, which may be stored within or otherwise available to SM-PCF 254-2, and the information received from SMF 240, SM-PCF 254-2 may also determine the content of some, or all of the AM policy decisions made by AM-PCF 254-1. As shown in FIG. 7, in response to a request for SM policy decisions (signal 745), received from SMF 240, SM-PCF 254-2 may transmit a request to and may receive relevant AM policy decisions from UDR 252 via Nudr interface 253 (signal 750). As described above, an identification of the relevant AM-PCF 254-1 is provided to SMF 240 by AMF 220 during PDU session establishment. Consistent with embodiments described herein, such identification information may be similarly provided to UDR 252 in policy decision request 750.

Based on the SM policies identified for enforcement as well as any AM policy decisions received from AM-PCF 254-1, SM-PCF 254-2 may render appropriate SM policy decisions (element 755). Based on these decisions, the PDU session may (or may not) be established by SMF 240 (element 760).

FIG. 8 is a flowchart of a process 800 for providing inter-PCF policy communications according to an implementation described herein. In some implementations, the process of FIG. 8 may be performed by PCF 254, such as PCF 254-2. In other implementations, some or all of the process of FIG. 8 may be performed by another device or a group of devices separate from PCF 254.

The process of FIG. 8 may include receiving a SM policy association request via Npcf interface 255 (Npcf_SMPolicyControl_Create) from SMF 240 in relation to a PDU session establishment request for a particular UE 110 (block 805). For example, as described above, following receipt of a registration request by AMF 220 from a UE 110 (via (R)AN 120), AMF 220 may discover and select an appropriate SMF 240 and may initiate a PDU session with SMF 240 on behalf of the UE 110. As part of this request, SMF 240 discovers (e.g., from NRF 258) and selects a PCF 254 (e.g., PCF 254-2) and transmits the Npcf_SMPolicyControl_Create request to the selected PCF. The Npcf_SMPolicyControl_Create request may include various elements relating to UE 110 and the requested PDU session, such as the subscriber's SUPI, the PDU session ID, the DNN, and the S-NSSAI, among other information. Consistent with embodiments described herein, the SM policy association request may also include the PCF ID relating to PCF 254 selected and used by AMF 220 during UE registration, as described above.

Upon receipt of the SM policy association request from SMF 240, PCF 254 identifies any applicable session management-related Policy Charging Control (PCC) rules (block 810). For example, PCF 254 may query a local repository of PCC rules. Alternatively, PCF 254 may retrieve the PCC rules from UDR 252, or other similar storage device shared between PCFs 254.

Consistent with embodiments described herein, PCF 254 also determines whether it is the same PCF 254 as that selected by AMD 220 during UE registration (block 815). For example, PCF 254-2 may determine whether the PCF ID received from SMF 240 indicating the PCF 254 selected and used by AMF 220 matches the PCF ID of the PCF 254-2. In other words, the PCF selected by SMF 240 determines whether it is the same as the PCF selected by the AMF 240. If so (block 815-YES), PCF 254-2 retrieves any AM policy decisions made during registration of UE 110 (block 820).

If it is determined that PCF 254-2 is not the same as PCF 254-1 selected by AMF 220 (block 815-NO), PCF 254-2 sends an AM policy decision request to UDR 252 designating AM policy decisions received from PCF 254-1 during UE registration and stored in the manner described above (block 825). For example, the AM policy decision request may include a designation of the PCF ID for the PCF 254 selected by SMF 240, as well as information identifying the subscriber, such as the SUPI, the PDU Session ID, the DNN, etc., all of which are available to PCF 254. In response, UDR 252 returns the requested AM policy decisions relating the registered UE/subscriber, if any (block 830). The SMF selected PCF then renders SM policy decisions based on the received AM policy decisions, as well as any other PCC rules identified for the particular PDU session being created (block 835).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of signals have been described with respect to FIGS. 4 and 7 and a series of blocks have been described with respect to FIGS. 5 and 8, the order of the signals and/or blocks may be modified in other implementations. Further, non-dependent signals and/or blocks may be performed in parallel, were appropriate.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   receiving, by a first network device, a request for a session management (SM) policy association in relation to establishment of a packet data unit (PDU) session for a particular user equipment (UE) device;
   sending, to a second network device, a request for access and mobility (AM) policy decisions pertaining to the UE device,
   wherein the first network device comprises a first policy control function (PCF) device in a core network and wherein the second network device comprises a second PCF device in the core network;
   receiving, by the first network device, the AM policy decisions from the second network device, and
   creating, by the first network device, the SM policy association based on at least the received AM policy decisions.

2. The method of claim 1, wherein the first PCF device is different than the second PCF device.

3. The method of claim 1, wherein the request for SM policy association includes an identifier associated with the second network device, the method further comprising:
   determining whether the first network device is the same as the second network device based on the identifier; and
   transmitting a request to the second network device when it is determined that the second network device is not the same as the first network device.

4. The method of claim 3, wherein the identifier comprises a policy control function (PCF) ID.

5. The method of claim 1, wherein the AM policy decision includes at least a decision relating to allowed or restricted tracking area identifiers (TAIs) associated with the UE during device registration.

6. The method of claim 1, further comprising:
   obtaining policy charging control (PCC) rules corresponding to the PDU session being established; and
   creating the SM policy association based on at least the received AM policy decisions and the obtained PCC rules.

7. A network device comprising:
   a memory storing instructions; and
   a processor configured to execute the instructions to:
      receive a request for a session management (SM) policy association in relation to establishment of a packet data unit (PDU) session for a particular user equipment (UE) device;
      sending, to a second network device, a request for access and mobility (AM) policy decisions pertaining to the UE device;
      receive AM policy decisions from the second network device, and
      create the SM policy association based on at least the received AM policy decisions,
   wherein the network device comprises a first policy control function (PCF) device in a core network and wherein the second network device comprises a second PCF device in the core network.

8. The network device of claim 7, wherein the first PCF device is different than the second PCF device.

9. The network device of claim 7, wherein the request for SM policy association includes an identifier associated with the second network device,
   wherein the processor is configured to further execute the instructions to:
      determine whether the network device is the same as the second network device based on the identifier; and
      transmit a request to the second network device when it is determined that the second network device is not the same as the first network device.

10. The network device of claim 9, wherein the identifier comprises a policy control function (PCF) ID.

11. The network device of claim 7, wherein the AM policy decision includes at least a decision relating to allowed or restricted tracking area identifiers (TAIs) associated with the UE during device registration.

12. The network device of claim 7, wherein the processor is configured to further execute the instructions to:
   obtain policy charging control (PCC) rules corresponding to the PDU session being established; and
   create the SM policy association based on at least the received AM policy decisions and the obtained PCC rules.

13. A non-transitory, computer-readable storage media storing instructions executable by one or more processors of one or more devices, which when executed cause the one or more devices to:
   receive, by a first network device, a request for a session management (SM) policy association in relation to establishment of a packet data unit (PDU) session for a particular user equipment (UE) device;

send, to a second network device, a request for access and mobility (AM) policy decisions pertaining to the UE device,
wherein the first network device comprises a first policy control function (PCF) device in a core network and wherein the second network device comprises a second PCF device in the core network;
receive AM policy decisions from the second network device; and
create the SM policy association based on at least the received AM policy decisions.

14. The non-transitory, computer-readable storage media of claim 13, wherein the AM policy decision includes at least a decision relating to allowed or restricted tracking area identifiers (TAIs) associated with the UE during device registration.

15. The non-transitory, computer-readable storage media of claim 13, wherein the instructions, when executed, further cause the one or more devices to:
obtain policy charging control (PCC) rules corresponding to the PDU session being established; and
create the SM policy association based on at least the received AM policy decisions and the obtained PCC rules.

16. The non-transitory, computer-readable storage media of claim 13, wherein the first PCF device is different than the second PCF device.

17. The non-transitory, computer-readable storage media of claim 13, wherein the request for SM policy association includes an identifier associated with the second network device, and wherein the instructions, when executed, further cause the one or more devices to:
determine whether the first network device is the same as the second network device based on the identifier; and
transmit a request to the second network device when it is determined that the second network device is not the same as the first network device.

18. The non-transitory, computer-readable storage media of claim 13, wherein the identifier comprises a policy control function (PCF) ID.

19. The non-transitory, computer-readable storage media of claim 13, wherein the instructions, when executed, further cause the one or more devices to:
obtain policy charging control (PCC) rules corresponding to the PDU session being established; and
create the SM policy association based on at least the received AM policy decisions and the obtained PCC rules.

* * * * *